United States Patent Office 2,929,842
Patented Mar. 22, 1960

2,929,842

RESOLUTION OF DL-GLUTAMIC ACID

Harold L. Fike, Chicago, Ill., assignor to International Minerals & Chemical Corporation, a corporation of New York No Drawing. Application August 5, 1958
Serial No. 753,209

10 Claims. (Cl. 260—534)

The present invention relates to the resolution of racemic amino acid compositions. More particularly, it relates to an improvement in the so-called "selective seeding technique" for the resolution of DL-glutamic acid.

In the chemical synthesis of optically active amino acids, it is common to find that the product is a racemic mixture of the enantiomorphic forms. For example, glutamic acid can be synthesized by treating 3-chlorocyclopentene with ozone, oxidizing with peroxide, reacting with ammonia at high temperature, and hydrolyzing, as described in Purvis U.S. Patent 2,833,786, issued May 6, 1958. The Purvis product is DL-glutamic acid, which must be subjected to further treatment (resolution) in order to obtain the desired L-enantiomer in substantially pure form.

Various methods have been proposed for effecting the resolution of DL-glutamic acid. One method involves preparing a supersaturated solution thereof, seeding with crystals of one enantiomer, and crystallizing the seeded enantiomer from the solution. A serious disadvantage of this method has been the short and critical crystallization time required therein. The crystallization time must of course be long enough to permit crystallization of the desired isomer. It is found, however, that the non-seeded enantiomer eventually undergoes spontaneous nucleation and crystallization, and tends for this reason to contaminate the seeded enantiomer. Thus, to obtain a substantially pure product with maximum resolution, the solution must be seeded and the desired isomer crystallized in a period of time which in some instances must be at least 25 minutes but cannot exceed 30 minutes. It is obvious that such a degree of control becomes exceedingly difficult when the process is carried out in equipment of commercial size. The present invention is an improvement in the selective seeding process, whereby spontaneous crystallization of the non-seeded enantiomer is avoided.

One object of the invention is to improve the resolution of racemic mixtures of optically active amino acids.

Another object is to improve the selective seeding process for resolving racemic amino acid mixtures.

Another object is to improve the resolution of DL-glutamic acid.

Another object is to prevent spontaneous crystallization of the non-seeded enantiometer in the resolution of DL-glutamic acid by the selective seeding technique.

Another object is to provide a method for resolving DL-glutamic acid by selective alternate crystallization of the enantiomers thereof.

Other objects of the invention will be apparent from the following description and claims.

The present invention, in one aspect, involves selective seeding and crystallization of a glutamic acid enantiomer from a solution supersaturated with DL-glutamic acid in the form of a hydrohalide salt and containing a strong mineral acid other than a hydrogen halide, e.g., sulfuric acid or orthophosphoric acid.

In one embodiment of the invention, aqueous 50% sulfuric acid is substantially saturated at ordinary temperature with DL-glutamic acid. The resulting solution is seeded with crystals of L-glutamic acid hydrochloride, while hydrogen chloride is added thereto at a rate sufficient to produce gradual crystallization of L-glutamic acid hydrochloride therefrom. Under these conditions, the seeded isomer crystallizes selectively, while the non-seeded isomer remains in solution and exhibits no tendency to crystallize spontaneously. By operating in this way, up to about 25% of the seeded isomer originally present in the solution can be crystallized in substantially pure form. The crystals are recovered in a simple manner by filtration, centrifugation, or the like, and are then washed and dried if desired.

The invention thus involves selective crystallization of a glutamic acid hydrohalide enantiomorph in the presence of seed crystals of the said enantiomorph, and in the presence of a strong mineral acid other than a hydrogen halide, preferably with continuous or intermittent addition of the corresponding hydrogen halide to produce or maintain supersaturation of the seeded enantiomorph. For this purpose, the hydrogen halide can be added in the form of an aqueous solution, preferably a concentrated or saturated aqueous solution, but is ideally added as a regulated stream of the substantially anhydrous hydrogen halide in order to avoid disturbing the acid-to-water balance of the resolution system.

The mechanism whereby the present invention achieves its novel result has not yet been established with certainty, but may involve the following considerations in a sulfuric acid-hydrochloric acid system. Glutamic acid hydrosulfate differs from glutamic acid hydrochloride in that the former is very soluble in sulfuric acid almost without regard to the $H_2SO_4$ concentration, while the latter is soluble to a degree inversely proportional to the concentration of HCl. If DL-glutamic acid is dissolved in sulfuric acid, and the resulting solution is treated with hydrogen chloride in the presence of L-glutamic acid hydrochloride seed crystals, it is theorized that the following reactions and effects occur:

(1) The HCl causes formation of DL-glutamic acid hydrochloride and eventually produces a concentration thereof above the saturation level.

(2) The L-isomer selectively crystallizes from the supersaturated solution on the seed crystals.

(3) The crystallization of the L-isomer reduces the concentration of HCl in the liquid phase.

(4) The reduction in HCl concentration caused by crystallization of the L-isomer minimizes or avoids any supersaturation of the D-isomer hydrochloride, and represses any tendency for the latter to crystallize. By appropriate adjustment of concentrations, the added hydrogen chloride can be rapidly and largely removed from the solution by crystallization of the L-isomer hydrochloride. Under these conditions, any supersaturation of the D-isomer hydrochloride is transient, being eliminated at once by the crystallization of the L-isomer hydrochloride.

(5) The sulfuric acid meanwhile maintains the remainder of the DL-glutamic acid in solution, and supplies a sufficient concentration of hydrogen ions to promote the rapid formation of L-glutamic acid hydrochloride, to prevent the dissociation of the latter, and to cause its almost immediate crystallization from the solution.

In another embodiment of the invention, aqueous 50% sulfuric acid is substantially saturated with DL-glutamic acid, hydrogen chloride is added to the solution until the saturation point of the DL-glutamic acid hydrochloride is nearly reached, seed crystals of L-glutamic acid hydrochloride are added, and the addition of hydrogen chloride is continued to produce selective crystallization of L-glutamic acid hydrochloride. The addition of hydrogen chloride and the crystallization are continued and completed as set forth hereinabove.

The invention can be successfully applied to the resolution of DL-glutamic acid hydrochloride, DL-glutamic acid hydrobromide, and DL-glutamic acid hydriodide. Other DL-glutamic acid compounds can similarly be resolved if they are first converted into one of the aforesaid hydrohalide compounds.

Sulfuric acid is the preferred strong mineral acid for use in the present invention. Other strong non-halogen mineral acids can also be used so long as they do not irreversibly alter the DL-glutamic acid starting material. Among such strong acids may be particularly mentioned the phosphoric acids, including orthophosphoric acid, metaphosphoric acid, pyrophosphoric acid, and the like.

The concentration of strong mineral acid employed should lie within relatively narrow limits in order for the invention to operate most effectively. Best results are obtained with sulfuric acid or orthophosphoric acid having a concentration around 50% by weight. Concentrations as high as about 65% can satisfactorily be employed, but higher concentrations tend to evolve hydrogen halide on standing. Concentrations as low as about 35% can be employed, but lower concentrations become relatively ineffective in preventing the dissociation of the seeded isomer and repressing the crystallization of the non-seeded isomer.

A strong mineral acid solution of the defined type will generally dissolve DL-glutamic acid in a proportion to produce a solution thereof containing from about 20 to about 40% by weight of DL-glutamic acid at ordinary temperatures, varying inversely as a function of the mineral acid concentration. It is generally preferred to start with a solution at or near the saturation level in DL-glutamic acid in order to obtain as large a yield of product as possible per unit volume of process vessel. To the solution is added hydrogen halide until the DL-glutamic acid hydrohalide saturation level is approached. Seeding is preferably carried out at this point, and the addition of hydrogen halide is continued in order to cause crystallization of the seeded enantiomer. The addition of hydrogen halide and the crystallization of the seeded isomer can be terminated at any point as desired, but must be terminated in any event when the quantity of the seeded isomer remaining in the solution falls to the saturation level therein of the hydrohalide of said isomer (i.e., the point at which further addition of hydrogen halide produces little or no further crystallization of the seeded isomer but instead serves to produce substantial supersaturation of the non-seeded isomer). In general, it is safe to continue the crystallization until about one-sixth of the total glutamic acid has been crystallized. In the hydrochloride system, this corresponds to the addition of about 3 to about 5% of hydrogen chloride, dry basis, based upon the total glutamic acid in the system. If the hydrogen chloride is added as an aqueous solution, a somewhat larger proportion is needed. Under these conditions, maximum crystallization of the seeded isomer is obtained while crystallization of the non-seeded isomer is substantially completely repressed.

After the seeded isomer has been crystallized and removed from the solution, the remaining solution (optionally after seeding with the other isomer) can be treated in the same manner with a further quantity of the hydrogen halide to produce selective crystallization of the said other isomer. Additional DL-glutamic acid can be added to the solution between crystallizations as required to maintain the total glutamic acid concentration therein. By operating in this way, total resolution of the DL-glutamic acid starting material can be achieved by an alternating sequence of selective crystallizations.

While the foregoing represents a preferred form of the invention, it will be understood that numerous departures may be made therefrom while still operating within the broad scope of the invention. It is convenient, for example, to prepare an aqueous sulfuric acid solution supersaturated with DL-glutamic acid hydrohalide, seed with crystals of one enantiomer of the glutamic acid hydrohalide, and crystallize. Under these conditions, the withdrawal of hydrogen halide with the crystals of the seeded isomer tends, in the presence of the sulfuric acid, to increase the solubility of the non-seeded isomer and to repress the crystallization thereof.

In the foregoing description of the invention, the step of selective seeding is for convenience described with reference to crystals of L-glutamic acid hydrohalide. It will be understood that seeding can alternatively be carried out with D-glutamic acid hydrohalide, and that seeding is feasible with either glutamic acid isomer so long as the particular isomer either exists in supersaturated condition in the solution, or can be placed in supersaturated condition, e.g., by addition of hydrogen halide.

The preparation of the solutions employed in the present invention may be carried out at any convenient temperature and by any convenient technique or procedure. The selective crystallization, however, should be carried out at a temperature below about 40° C. and above the freezing point of the solution, and is preferably carried out at ordinary temperatures around 20 to 25° C.

The invention will be more fully understood from the following operating examples.

*Example 1*

DL-glutamic acid (30 g.), hereinafter referred to as "DL-GA," was dissolved in 50% sulfuric acid (200 g.). To the solution were added 8 ml. of 37% hydrochloric acid and immediately thereafter 2 g. of L-glutamic acid hydrochloride ("L-GA·HCl") seed crystals. The mixture was stirred ½ hour at room temperature, during which time the seed crystals dissolved, indicating that the HCl concentration was not great enough. Additional 37% hydrochloric acid (8 ml.) and L-GA·HCl seed crystals (1 g.) were then added, and stirring was continued for 1½ hours. The resulting slurry was filtered, and 8 g. of pure L-GA·HCl crystals were recovered, corresponding to a resolution of 20% based on the L-isomer present in the solution.

The mother liquor was allowed to stand 72 hours to observe and collect any additional precipitate. Filtration then yielded a solid weighing 2.6 g. and consisting of essentially pure D-GA·HCl.

*Example 2*

To 200 g. of 50% sulfuric acid were added 40 g. of DL-glutamic acid (equivalent to 50 g. of DL-GA·HCl), and the mixture was stirred until dissolved. The resulting solution was seeded with 3 g. of L-GA·HCl crystals, 25 g. of 37% hydrochloric acid were added, and crystallization was allowed to proceed for 1½ hours at room temperature. The crystals were filtered off, weighed (12 g., wet), and found to contain 7.8 g. of pure L-GA·HCl, or 4.8 g. in excess of the seed crystals.

The mother liquor was stirred for 3 additional hours, but no further crystallization took place.

*Example 3*

A solution of 80 g. of DL-GA (equivalent to 100 g. of DL-GA·HCl) in 200 g. of 50% sulfuric acid was seeded with 3 g. of L-GA·HCl crystals, and 15 g. of 37% hydrochloric acid were added. After a crystallization period of 16 hours at room temperature, crystals weighing 12 g. (wet basis) were recovered, containing 9.6 g. of L-GA·HCl, equivalent to a resolution yield of 6.6 g. of L-GA·HCl.

*Example 4*

A solution of 200 g. of DL-GA in 500 g. of 50% orthophosphoric acid was stirred and seeded at room temperature with 10 g. of L-GA·HCl crystals while anhydrous HCl was simultaneously being bubbled into the liquid. Stirring was continued for a total of 72 hours, during which 16 g. of HCl were added. The mixture was then filtered. The crystals weighed 39.2 g., dry, and contained 12.5 g. of L-GA·HCl in excess of the seed crystals.

To the filtrate were added 5.8 g. of anhydrous HCl, and the mixture was stirred for 4 hours. The resulting slurry was filtered, and the crystals were weighed (25.3 g., dry) and found to contain 20.2 g. of resolved D-GA·HCl.

While the invention has been described with reference to certain specific starting materials, process materials, operating conditions, manipulative techniques, and the like, it is to be understood that such matters are intended only as specific illustrations of the broad invention, and not as limitations upon the scope thereof. Numerous modifications and equivalents of the invention will be apparent from the foregoing description to those skilled in the art.

The following claims particularly point out and distinctly claim the subject matter of the present invention.

I claim:

1. In a resolution process wherein a supersaturated aqueous solution of a DL-glutamic acid hydrohalide selected from the group consisting of DL-glutamic acid hydrochloride, DL-glutamic acid hydrobromide, and DL-glutamic acid hydriodide is seeded with crystals of one enantiomorph of said glutamic acid hydrohalide and the seeded enantiomorph is selectively crystallized and recovered therefrom, the improvement which comprises incorporating a strong non-halogen mineral acid selected from the group consisting of sulfuric acid and the phosphoric acids in said solution in a proportion sufficient to prevent spontaneous crystallization of the non-seeded enantiomorph.

2. A resolution process which comprises preparing a solution of DL-glutamic acid in an aqueous solution of a strong non-halogen mineral acid selected from the group consisting of sulfuric acid and the phosphoric acids containing between about 35 and about 65% by weight of said mineral acid, adding to the resulting solution a hydrogen halide selected from the group consisting of hydrogen chloride, hydrogen bromide, and hydrogen iodide in the presence of crystals of one enantiomorph of the corresponding hydrogen halide salt of glutamic acid, whereby selected crystallization of the corresponding enantiomorph is produced while spontaneous crystallization of the non-seeded enantiomorph is repressed, and recovering the seeded enantiomorph from the resulting slurry.

3. A process as in claim 2 wherein said mineral acid is sulfuric acid.

4. A process as in claim 2 wherein said mineral acid is orthophosphoric acid.

5. A resolution process which comprises preparing a solution of DL-glutamic acid in aqueous sulfuric acid containing between about 35 and about 65% by weight $H_2SO_4$, adding hydrogen chloride to said solution in the presence of crystals of one enantiomorph of glutamic acid hydrochloride, whereby selected crystallization of the corresponding enantiomorph is produced while spontaneous crystallization of the non-seeded enantiomorph is repressed, and recovering the seeded enantiomorph from the resulting slurry.

6. A process as in claim 5 wherein said aqueous sulfuric acid contains around 50% by weight of $H_2SO_4$.

7. A resolution process which comprises preparing a solution of DL-glutamic acid in aqueous orthophosphoric acid containing between about 35 and about 65% by weight of $H_3PO_4$, adding hydrogen chloride to said solution in the presence of crystals of one enantiomorph of glutamic acid hydrochloride, whereby selective crystallization of the corresponding enantiomorph is produced while spontaneous crystallization of the non-seeded enantiomorph is repressed, and recovering the seeded enantiomorph from the resulting slurry.

8. A process as in claim 7 wherein said aqueous orthophosphoric acid contains around 50% by weight of $H_3PO_4$.

9. A resolution process which comprises preparing a solution of DL-glutamic acid in an aqueous solution of a strong non-halogen mineral acid selected from the group consisting of sulfuric acid and the phosphoric acids containing between about 35 and about 65% by weight of said mineral acid, adding to the resulting solution a hydrogen halide selected from the group consisting of hydrogen chloride, hydrogen bromide, and hydrogen iodide in the presence of crystals of one enantiomorph of the corresponding hydrogen halide salt of glutamic acid, whereby selective crystallization of the corresponding enantiomorph is produced while spontaneous crystallization of the non-seeded enantiomorph is repressed, terminating the crystallization when not more than about one-sixth of the glutamic acid originally contained in the solution has crystallized, and recovering the seeded enantiomorph from the resulting slurry.

10. A resolution process which comprises preparing a solution of DL-glutamic acid in an aqueous solution of a strong non-halogen mineral acid selected from the group consisting of sulfuric acid and the phosphoric acids containing between about 35 and about 65% by weight of said mineral acid, adding to the resulting solution a hydrogen halide selected from the group consisting of hydrogen chloride, hydrogen bromide, and hydrogen iodide in the presence of crystals of one enantiomorph of the corresponding hydrogen halide salt of glutamic acid, whereby selective crystallization of the corresponding enantiomorph is produced while spontaneous crystallization of the non-seeded enantiomorph is repressed, separating the seeded enantiomorph from the resulting slurry, thereafter crystallizing the opposite enantiomorph from the remaining solution, and recovering said opposite enantiomorph from the resulting slurry.

References Cited in the file of this patent

UNITED STATES PATENTS 2,734,919  Amiard et al. _____ Feb. 14, 1956

OTHER REFERENCES

Gilman: Organic Chemistry, 2nd Ed., vol. I (1938), pp. 187-8.

Houben: Die Methoden der Org. Chem., vol. II (1943), p. 1065.